United States Patent
Mathews

(10) Patent No.: US 7,055,137 B2
(45) Date of Patent: May 30, 2006

(54) DISTRIBUTED AUTOMATED SOFTWARE GRAPHICAL USER INTERFACE (GUI) TESTING

(75) Inventor: John A. Mathews, Carrollton, TX (US)

(73) Assignee: i2 Technologies US, Inc., Dallas, TX (US)

( * ) Notice: Subject to any disclaimer, the term of this patent is extended or adjusted under 35 U.S.C. 154(b) by 625 days.

(21) Appl. No.: 09/998,363

(22) Filed: Nov. 29, 2001

(65) Prior Publication Data

US 2003/0098879 A1   May 29, 2003

(51) Int. Cl.
   *G06F 9/44* (2006.01)
(52) U.S. Cl. .......................... 717/125; 714/46
(58) Field of Classification Search ............... 717/124, 717/168, 125 T; 395/183, 575; 345/762; 714/46.38 T
   See application file for complete search history.

(56) References Cited

U.S. PATENT DOCUMENTS

| | | | | |
|---|---|---|---|---|
| 5,371,883 | A | | 12/1994 | Gross et al. ................ 395/575 |
| 5,600,789 | A | * | 2/1997 | Parker et al. ................ 714/38 |
| 5,909,544 | A | * | 6/1999 | Anderson et al. .......... 709/208 |
| 6,067,639 | A | | 5/2000 | Rodrigues et al. ........... 714/38 |
| 6,182,245 | B1 | * | 1/2001 | Akin et al. ................... 714/38 |
| 6,467,537 | B1 | * | 10/2002 | Bujak, Jr. ................... 165/209 |
| 6,473,707 | B1 | * | 10/2002 | Grey .......................... 702/123 |
| 6,510,402 | B1 | * | 1/2003 | Logan et al. ............... 702/186 |
| 6,701,514 | B1 | * | 3/2004 | Haswell et al. ............. 717/115 |
| 6,766,481 | B1 | * | 7/2004 | Estep et al. ..................... 1/1 |
| 6,804,709 | B1 | * | 10/2004 | Manjure et al. ............ 709/220 |

OTHER PUBLICATIONS

Memon, Atif M; Pollack, Martha E; Soffa, Mary Lou; "Hierarchical GUI Test Case Generation Using Automated Planning", p. 144-155, May 2000, IEEE, retrieved Aug. 16, 2004.*

Memon, Atif M; Soffa, Mary Lou; Pollack, Martha E; "Coverage Criteria for GUI Testing", p. 256-267, Sep. 2001, ACM, retrieved Aug. 16, 2004.*

Ostrand, Thomas; Anodide, Aaron; Foster, Herert; Goradia, Tarak; "A Visual Test Development Environment for GUI Systems" p. 82-92, Mar. 1998,ACM, retrieved Aug. 16, 2004.*

(Continued)

*Primary Examiner*—Wei Y. Zhen
*Assistant Examiner*—Mary Steelman
(74) *Attorney, Agent, or Firm*—Steven J. Laureanti; James E. Walton

(57) ABSTRACT

A method for distributed automated software GUI testing includes maintaining a centralized queue, which stores test instances to be executed by distributed test execution computers ("test computers"). Each test computer includes a client platform and is connected to one or more server platforms, the client and server platforms collectively providing client-server combinations against which the tests may be executed. For each test computer: (1) a request for a test instance is received from a test computer in response to completion of a preceding test by the test computer; (2) in response, a test instance is retrieved from the queue and communicated to the test computer for execution using a testing component supported by the test computer; (3) the component performs automated software GUI testing and produces test results; and (5) in response to execution of the instance, a test result for the executed instance is received and stored.

47 Claims, 3 Drawing Sheets

OTHER PUBLICATIONS

Tufarolo, J; Nielsen, J; Symington, S; Weatherly, R; Wilson, A; Ivers, J; Hyon, T; "Automated Distributed System Testing: Designing an RTI Verification System", p. 1094-1102, Dec. 1999, ACM, retrieved Aug. 16, 2004.*

* cited by examiner

TEST RESULTS

[Image Key]

CLIENT PLATFORM: win_nt (Check job queue)

FUNCTIONALITY_TESTING: results generated on: Thu Jun 7 13:33:07 2001

TEST FILTER: Show recent tests that were run in the last [ ▼ ] for username [All users ▼] [Go]

seema shobhit manish slam

| Data Sets and the SERVERS tested | aix4.3 | os400 | cpq64 | hpux11.0 | sol2. |
|---|---|---|---|---|---|
| alt_parts\alt_parts_set9\ | | | | | |
| alt_routing\alt_routing.set1\ | | | | | |
| alt_routing_lateness_set1\ | | | | | |
| alt_routing_lateness_set2\ | | | | | |
| ⋮ | ⋮ | | | | |
| Number of Passes | 79 | 17 | 28 | 105 | 91 |
| Number of Failures | 39 | 68 | 30 | 46 | 40 |
| Unavailable | 53 | 86 | 113 | 20 | 40 |
| Total Tests Run | 118 | 85 | 58 | 151 | 131 |
| Success % | 66.9 | 20 | 48.2 | 69.5 | 69.4 |
| Coverage % | 69 | 49.7 | 33.9 | 88.3 | 76.6 |

* = 175 tests run within last 24 hours

Run Test at Location: Dallas   Bangalore

[Run selected tests]

Test selection:

[Select all] [PASS only] [FAIL only] [NA only] [Add PASS] [Add FAIL]
[Add NA] [Unselect all]

*FIG. 2*

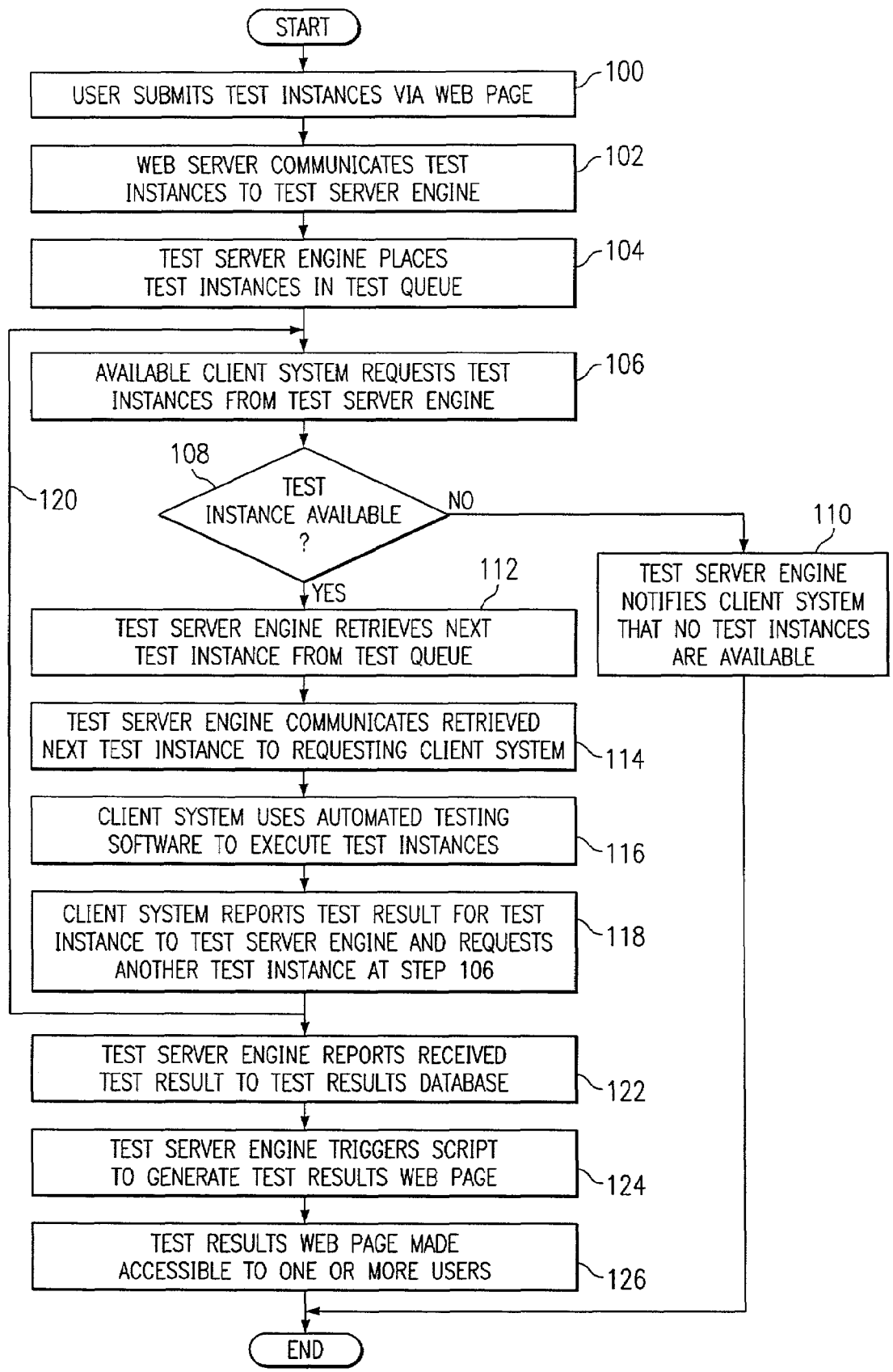

DISTRIBUTED AUTOMATED SOFTWARE GRAPHICAL USER INTERFACE (GUI) TESTING

TECHNICAL FIELD OF THE INVENTION

This invention relates generally to software graphical user interface (GUI) testing and more particularly to distributed automated software GUI testing.

BACKGROUND OF THE INVENTION

A GUI is an important part of most software applications. The GUI is often the principal or only mechanism by which a user can provide input to and receive output from the software application with which the GUI is associated. It is therefore essential that the GUI operate correctly and efficiently for the successful operation of the associated software application, making thorough testing of the GUI imperative in most cases. Testing of any software may be a time consuming process, but this is particularly true for GUI testing. The GUI must be tested over all potential platforms, often including numerous client-server combinations. GUI testing also often requires a human tester to enter numerous commands to simulate mouse-clicks, keyboard inputs, or other operations of actual users, and to thereafter verify that the GUI produces the expected results. Not only is this process time-consuming and labor-intensive, it is also subject to human error. The difficulties involved in executing GUI tests can jeopardize quality, as associated software applications are often subject to very aggressive release schedules. Any of these or other disadvantages may make previous software GUI testing techniques inadequate for many needs.

SUMMARY OF THE INVENTION

According to the present invention, disadvantages and problems associated with previous software GUI testing techniques may be reduced or eliminated.

In one embodiment of the present invention, a method for distributed automated software graphical user interface (GUI) testing includes maintaining a centralized test queue, which stores multiple software GUI test instances to be executed by multiple distributed test execution computers. Each distributed test execution computer includes a client platform and is connected to one or more server platforms. The client platforms and server platforms collectively provide multiple client-server combinations against which the software GUI test instances may be executed. For each distributed test execution computer, a request for a next software GUI test instance is received from a particular distributed test execution computer in response to completion of a preceding software GUI test instance by the particular distributed test execution computer and, in response, a software GUI test instance is retrieved from the test queue. The retrieved software GUI test instance is communicated, for each distributed test execution computer, to the particular distributed test execution computer for execution against a particular client-server combination using a testing component supported by the particular distributed test execution computer. The testing component performs automated software GUI testing and produces test results for such testing. A test result for the software GUI test instance from the particular distributed test execution computer is received in response to the execution of the test instance and stored for reporting to one or more users.

Particular embodiments of the present invention may provide one or more technical advantages. For example, in certain embodiments of the present invention, a centralized test server engine efficiently manages scheduling, distributed execution, and results reporting for automated software GUI testing. The test server engine may allow testers to efficiently schedule tests for execution, command test execution on remote or other distributed test execution computers, compile test results from the test execution computers, and automatically publish the test results in substantially real time. The test server engine may support scaling to large numbers of distributed test execution computers and may maintain a high utilization rate for each test execution computer in its testing network. By dividing test execution across parallel, distributed test execution computers, GUI testing cycle times may be greatly reduced. As just one non-limiting example, in one project a test server engine incorporating aspects of the present invention was used across fifteen distributed test execution computers to execute between approximately five hundred and one thousand tests per day, achieving approximately ninety percent utilization on each test execution computer, and reducing the GUI testing cycle time from approximately one hundred days to approximately six days. In addition, certain embodiments may facilitate automated regression testing and better support GUI testing in shortened software release cycles. Certain embodiments may thus provide more thorough testing for improved quality assurance while still allowing aggressive time-to-market constraints to be met. Certain embodiments may also allow software products to be more quickly certified on new platforms.

Standard distributed test execution methods utilize static test scheduling. In static scheduling, all tests to be executed are divided among available computer resources at the beginning of the testing cycle and then each computer processes its assigned tests. Static scheduling often leads to inefficiency because variability in test execution time, based on the nature of the tests and variations in processing power among the computers, may cause one computer to finish its assigned tests much earlier than other computers, such that it must sit idly by while other computers are overloaded. In contrast, certain embodiments of the present invention provide dynamic job scheduling, which allows distributed test execution computers of varying capacities and speeds to be more fully utilized throughout software GUI testing, with each test execution computer substantially immediately scheduling itself another test from a centralized test queue as soon as it completes the prior test. This may greatly reduce the manpower and time required to complete the GUI testing cycle, permitting associated software products to be released more quickly and potentially increasing revenue.

Certain embodiments of the present invention may provide substantially real-time results reporting. In certain embodiments, as software GUI test instances complete on the distributed test execution computers, the results of these tests are automatically and substantially immediately reported to a centralized database of test results. When a new test result is reported, the test server engine may automatically cause a new test results web page to be generated incorporating the new test result, which may be accessible to interested users through a web server. Embodiments incorporating this feature may thus provide substantially real-time cumulative test result status. Certain embodiments may also allow users to schedule tests for subsequent execution by selecting one or more tests for which test results are reflected in a test results web page.

In certain embodiments of the present invention, in cooperation with the test server engine, a client controller operating on each distributed test execution computer may automatically install a current software build on its distributed test execution computer at one or more appropriate times to help ensure that its test execution computer is testing against the most recent software build available. In certain embodiments, each client controller may carry out a reboot of its test execution computer at one or more appropriate times (e.g., twice a day) to help ensure that the test execution computer is less likely to "hang up" due to operating system instabilities. This may help prevent the entire testing system from "going down" as a whole. If a certain distributed test execution computer experiences problems, only a single test may be impacted. In certain embodiments, the client controller of each test execution computer is set up to automatically start software code that establishes communication with the test server engine when its test execution computer boots up. One or more of these features may enable each test execution computer to become, in effect, a test execution robot, running automatically and without human intervention for extended periods of time, further reducing the cost of software GUI testing.

Systems and methods incorporating one or more of these or other technical advantages may be well suited for modern software GUI testing environments. Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2 illustrates an example test results web page; and

FIG. 3 illustrates an example method for distributed automated software GUI testing.

DESCRIPTION OF EXAMPLE EMBODIMENTS

Figure 1:
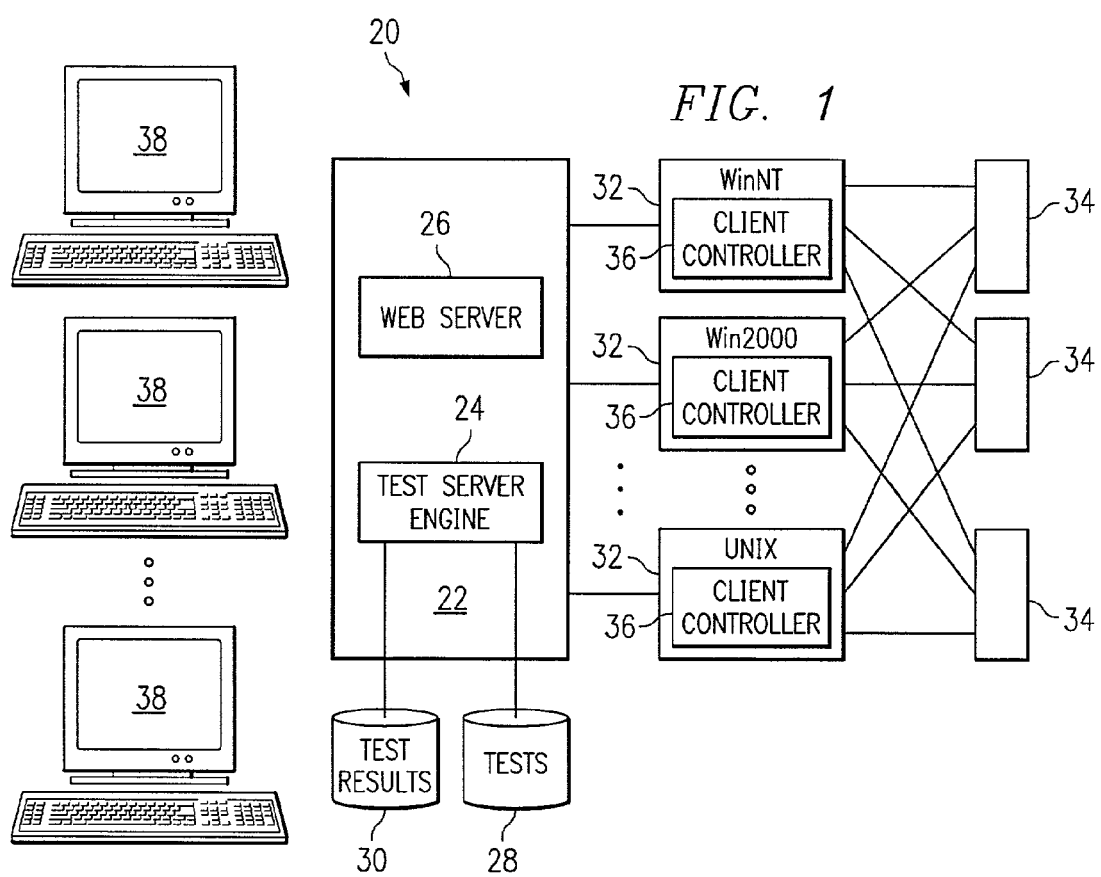
FIG. 1 illustrates an example system for distributed automated software GUI testing.

FIG. 1 illustrates an example system 20 for distributed automated software GUI testing. System 20 includes a server system 22, which includes a test server engine 24, a web server 26, a test queue 28, and a test results database 30. Test server engine 24 provides certain centralized features for distributed automated software GUI testing and, in certain embodiments, efficiently manages scheduling, distributed execution, and substantially real-time results reporting for distributed automated software GUI testing. In general, test server engine 24 receives requests for test instances from multiple distributed test execution computers, retrieves the requested test instances from test queue 28, submits the retrieved test instances for execution in parallel on multiple distributed test execution computers, receives test results for executed test instances from the multiple distributed test execution computers, and stores the received test results in test results database 30 for reporting to one or more users.

In one embodiment, server system 22 is coupled to multiple distributed client systems 32, which are in turn each coupled to one or more server platforms 34. Client systems 32 may be physically distributed, being in different physical locations geographically remote from each other and from server system 22, or logically distributed, being at approximately the same location as other client systems 32 and server system 22. Each client system 32 may be coupled to server system 22 using one or more computer buses, local area networks (LANs), metropolitan area networks (MANs), wide area networks (WANs), a global computer network such as the Internet, or any other wireline, optical, wireless, or other links. Similarly, each server system 34 may be coupled to one or more client systems 32 using one or more computer buses, LANs, MANs, WANs, a global computer network such as the Internet, or any other wireline, optical, wireless, or other links.

Client systems 32 function as test execution computers for executing software GUI test instances received from test server engine 24 and reporting test results to test server engine 24 according to operation of system 20. In one embodiment, a client controller 36 operating on each client system 32 provides a control layer that receives, executes, monitors, and returns test results for automated software GUI test instances from test server engine 24. Each client controller 36 may also periodically install current software builds on its client system 32, periodically reboot its client system 32, and establish communication with test server engine 24 when its client system 32 boots up, as described below.

Each client system 32 may operate using a different client platform, or two or more clients systems 32 may operate using identical client platforms. For example, suitable client platforms for software GUI testing might include, without limitation, WINDOWS NT, WINDOWS 2000, WINDOWS 98, WINDOWS ME, WINDOWS XP, UNIX, and DOS. Similarly, server systems 34 may each support a different server platform, or two or more server systems 34 may support identical server platforms. Client systems 32 and the server systems 34 with which they are associated are preferably selected to provide a complete range of testing scenarios, across all appropriate client-server combinations, to help ensure thorough software GUI testing. For example, all GUI operations may not perform equally on all client-server combinations. It may be beneficial to know which particular GUI operations are problematic in which particular client-server environments so that such problems can be addressed specifically.

In certain embodiments, client systems 32 may each use specialized testing software to automatically execute software GUI test instances received from test server engine 24 and produce test results for executed test instances, subject to the control of the associated client controller 36. For example only and without limitation, such testing software may include WINRUNNER software developed by MERCURY INTERACTIVE CORPORATION. Although WINRUNNER is primarily described, any software capable of providing an appropriate environment for automated software GUI testing may be used. WINRUNNER code permits automation of software GUI testing by allowing customized programs to be created to control the flow of information to and from the software GUI being tested, in other words, to simulate interactions with software GUI users. For example, software GUI tests may simulate keyboard strokes, mouse clicks, or other methods of providing input to the GUI, reading associated data from the GUI, and returning results of processing that data to the GUI. In one embodiment, the software GUI test code is written in a test script language supported by the WINRUNNER or other testing software being used. Client controller 36 reads the test result for an executed test instance produced by the testing software, formats the test result as appropriate, and returns the test result to test server engine 24.

Standard distributed test execution methods utilize static test scheduling. In static scheduling, all test instances to be executed are divided among available computers at the beginning of the testing cycle and then each computer processes its assigned test instances until its test instances are completed. Static scheduling often leads to inefficiency because variability in test execution time, based on the nature of the tests or variations in processing power among the computers, may cause some computers to finish their assigned tests much earlier than other computers, such that some computers must sit idly by for long periods while other computers are overloaded.

In contrast, certain embodiments of the present invention provide dynamic scheduling, where each client system 32 is capable of requesting a test instance any time client system 32 is sitting idle, preferably immediately after completing a preceding test instance. For example, in a preferred embodiment, after a client system 32 completes a test instance and the associated client controller 36 reports test results for the test instance, client controller 36 of client system 32 immediately requests another test instance from test server engine 24. In response to a request from client system 32, test server engine 24 assigns the next test instance in test queue 28 to the requesting client system 32. This permits a substantially constant flow of test instances from test server engine 24 to client systems 32 and substantially constant utilization of client systems 32 throughout the testing cycle, even where the nature of the tests and capabilities of client systems 32 vary. Test server engine 24 may support scaling to any suitable number of client systems 32. By dividing test execution across parallel, distributed test execution computers, testing cycle times may be greatly reduced. As just one non-limiting example, in one project a test server engine incorporating aspects of the present invention was used across fifteen distributed test execution computers to execute between approximately five hundred and approximately one thousand software GUI test instances per day, achieving approximately ninety percent utilization on each test execution computer and reducing the testing cycle time from approximately one hundred days to approximately six days. Decreasing the overall testing time allows more test instances to be executed in a shorter period, potentially increasing the accuracy and thoroughness of the testing while still allow aggressive time-to-market constraints to be met. In addition, by reducing the manpower and time required to complete a testing cycle, embodiments of the present invention may reduce GUI testing costs significantly.

In certain embodiments, each client controller 36 may automatically install current software builds on its client system 32 to ensure that its client system 32 is testing against the most recent software build available. This may occur periodically or as otherwise appropriate. Client controller 36 may automatically reboot its client system 32 on a periodic or other basis. Automatic rebooting helps ensure that client systems 32 are less likely to "hang up" due, for example, to operating system instabilities. In one embodiment, client controller 36 may also automatically establish communication with test server engine 24 when client system 32 boots up. This may help ensure that a client system 32 can fail, automatically reboot, and immediately begin testing again without any human intervention. In one embodiment, client systems 32 may be brought on and off line without disruption of testing by other client systems 32. These features, singly or in combination, may decrease system downtime, decrease the need for human intervention, and allow the number of client systems 32 to be scaled up to further shorten the testing cycle. In effect, at least in part due to one or more of these features, each client system 32 functions as a test execution robot, running automatically without human intervention for extended periods of time, further reducing the cost of software GUI testing.

One or more client computers 38 may interact with server system 22 according to suitable input from any number of associated users. One or more users may submit software GUI test instances for execution using one or more web pages accessed via associated client computers 38 and web server 26. For example, a list of available tests may be displayed on a web page, as describe below with reference to FIG. 2, and the user may select one or more of these tests. Web server 26 communicates the submitted test instances to test server engine 24, which places corresponding test instances in test queue 28. In one embodiment, test server engine 24 may use Perl Common Gateway Interface (CGI) scripts to support user submission of test instances.

Test server engine 24 may place test instances in test queue 28 based on specified priorities, according to a first-in/first-out (FIFO) scheme, or in any other suitable manner. Test server engine 24 may use appropriate scripts to manage test queue 28 and apply appropriate rules for placement of test instances in test queue 28. For example, if a particular test passes numerous times and then fails, it may be desirable to determine the specific cause of the failure. In response to a test failure, the test that failed might be run across all client-server combinations so the scope of the problem can be determined and the cause isolated and fixed. As another example, a subset of tests in test queue 28 may be flagged to be executed on a more frequent basis. This might include executing tests flagged as higher priority during a certain period and tests flagged as lower priority during another period of time. In this case, test queue 28 may include corresponding higher priority and lower priority test queues. Test server engine 24 may, upon receiving requests for tests from client systems 32, retrieve tests only from the higher priority test queue, switching to the lower priority test queue only when the higher priority test queue is empty. Test queue 28 may represent any suitable system of one or more queues according to particular needs. Test server engine 24 may be configured to detect when test queue 28, or a constituent test queue within test queue 28, is below a predefined threshold and to automatically fill test queue 28 or the constituent test queue with tests until the same or a different predefined threshold is exceeded. This helps ensure that system 20 remains in substantially continuous operation.

Test server engine 24 receives test results for executed test instances from client controllers 36 of client systems 32 and stores the test results in test results database 30. In one embodiment, code of test server engine 24 triggers a Perl or other script upon receipt of a test result, which stores the test result in test results database 30 and triggers a Perl or other script to generate a test results web page (possibly updating an existing test results web page) to reflect the newly received test result along with previous test results. As a result, certain embodiments may provide substantially real-time reporting of software GUI test results. The test results web page may be periodically "pushed" to one or more client computers 38 associated with one or more users, made accessible to users on an as needed "pull" basis, or may be provided to users in any other suitable manner.

The test results web page may provide consolidated test results by client platform, server platform, or otherwise.

Where test results are reported for individual test instances, the test results web page may indicate the test date and time along with the test result. In one embodiment, the test results web page may indicate the test result, age of the test result, or other information concerning a test using color, shading, text, or any other suitable indicia. The test results web page may permit a user to view the current contents of test queue 28. This may allow a user to determine the fullness of test queue 28, whether instances of a particular test are scheduled to execute or need to be rescheduled, when instances of a particular test might be executed, what priority to assign or reassign to a particular test, or other suitable information. In an embodiment of system 20 including web server 26, system 20 may also be capable of testing web user interfaces. This may include testing a client browser operating on a client system 32 with respect to its interaction with web server 26. An example test results web page is described more fully below with reference to FIG. 2.

Server system 22 may include one or more computers at one or more locations, which may be independent or may share data storage, communications, or other resources according to particular needs. Each computer may include one or more suitable input devices, output devices, mass storage media, processors, memory, communications interfaces, or other components for receiving, processing, storing, and communicating information according to the operation of system 20. Furthermore, functionality described in connection with test server engine 24, web server 26, test queue 28, and test results database 30 may be provided using any suitable software components in association with appropriate hardware. Test queue 28 and test results database 30 may operate at the same location as test server engine 24 or may operate on one or more computer systems at different locations than the computer system supporting test server engine 24. Although described as a queue, test queue 28 may include any suitable data storage arrangement as is appropriate, and reference to a queue is meant to encompass all such arrangements as are appropriate. Although described as a database, test results database 30 may include any suitable data storage arrangement as is appropriate, and reference to a database is meant to encompass all such arrangements as are appropriate.

In operation of an example embodiment of system 20, one or more users may submit software GUI test instances using one or more web pages accessed via associated client computers 36 and web server 26. Web server 26 communicates the submitted test instances to test server engine 24, which places the test instances in test queue 28. Client controller 36 of an available client system 32 may request a software GUI test instance from test server engine 24 in response to completing a preceding test instance. In response to the request from client system 32, test server engine 24 determines whether test queue 28 contains one or more test instances. If test queue 28 is empty, test server engine 24 may notify client controller 36 that no test instances are available for execution. If a test instance is available in test queue 28, test server engine 24 retrieves the next test instance from test queue 28 and communicates the retrieved test instance to the requesting client system 32 for execution. Test server engine 24 may update the test results web page to reflect the status of the test instance (in progress).

Client system 32 may use WINRUNNER software to execute the test instance, although, as stated above, any automated testing software may be used. In one embodiment, when client system 32 has completed executing the test instance, client controller 36 of client system 32 reports the test result for the test instance to test server engine 24 and, substantially simultaneously or substantially immediately thereafter, requests another test instance from test server engine 24. Test server engine 24 stores the received test result in test results database 30 and triggers a script to generate an updated test results web page reflecting the new test result, which may be accessed in any suitable manner by one or more users. These operations preferably occur in parallel and substantially continuously across all client systems 32 throughout the testing cycle to provide one or more of the technical advantages described above.

FIG. 2 illustrates an example test results web page 40, which may be accessed by a user using an associated client computer 38 and web server 26. In general, test results web page 40 provides a concise display of test results for software GUI test instances executed by client systems 32 and the status of those test instances. In the illustrated example, test results web page 40 provides consolidated test results for a particular client platform, although a test results web page may provide test results for all or any suitable subset of software GUI test instances. Test results web page 40 may indicate the particular client platform to which the test results correspond. For example, as indicated at 42, the particular client platform with which test results web page 40 is associated in this case is WINDOWS NT. Test results web page 40 may indicate when the test results contained in test results web page 40 were last updated. For example, as indicated at 44, test results web page 40 in this case provides test results last updated at 13:33:07 on Thursday, Jun. 7, 2001. As indicated at 46, test results web page 40 may be generated according to a test filter such that test results web page 40 includes test results only for test instances submitted or executed in a particular time period, only for test instances submitted by a particular user, or any other suitable subset of test instances.

In one embodiment, test results web page 40 includes a test results table 48 having a row for each test 50. In the illustrated embodiment, in which test results web page 40 provides consolidated test results for a particular client platform, test results table 48 may include a column for each server platform 52 against which tests 50 may be executed. Intersections of rows and columns of test results table 48 define cells each corresponding to a particular combination of a test 50 and a server platform 52. Color, shading, or other indicia within a cell may indicate the corresponding test result, the age of the test result, the status of testing for the test 50 (e.g., percentage of test instances completed), or any other suitable information for the particular combination of test 50 and server platform 52. For example only and without limitation, red shading in a cell may be used to indicate that the most recently executed instance of test 50 failed. Dark green shading may be used to indicate that the most recently executed instance of test 50 ran and passed, while progressively lighter shades of green may be used to indicate that the most recently executed instance of test 50 passed but that the test result has aged some amount. Yellow shading may be used to indicate that no instances of test 50 have been executed. As another example, an asterisk or other indicator in a cell may indicate that a certain number of tests 50 have been executed on the corresponding server platform 52 in a specified time period. In one embodiment, as described above, test results web page 40 may allow a user to select a particular cell to submit one or more instances of the corresponding test 50 for execution on the corresponding server platform 52.

Test results table 48 may include summary information for tests 50. For example, test results table 48 may provide the total number of passes 54 for each server platform 52, the total number of failures 56 for each server platform 52, the number of tests 50 for which test results are unavailable 58 for each server platform 52, the total number of test instances executed 60 for each server platform 52, a success percentage 62 for each server platform 52, a coverage percentage 64 for each server platform 52, or any other suitable summary information. Success percentage 62 may indicate the percentage of times test instances passed for a server platform 52 and may be calculated by dividing the number of passes 54 by the total number of test instances executed 60 and multiplying the resulting quotient by one hundred. Coverage percentage 64 may indicate the number of test instances executed as a percentage of the total test instances to be executed. Test results web page 40 may include one or more buttons 66 or other input mechanisms that provide additional functionality to a user. In the illustrated embodiment, example buttons 66 include "Run Selected Tests," "Select All," "PASS Only," "FAIL Only," "NA (Unavailable) Only," "Add PASS," "Add FAIL," "Add NA (Unavailable)," and "Unselect All."

FIG. 3 illustrates an example method for distributed automated software GUI testing. At step 100, one or more users submit software GUI test instances using one or more test results web pages 40 accessed via associated client computers 38 and web server 26. At step 102 web server 26 communicates the submitted test instances to test server engine 24. Test server engine 24, at step 104, places the test instances in test queue 28. This association, as stated in conjunction with FIG. 1, may be based on a specified priority, first in/first out rules, or any appropriate set of rules. At step 106, client controller 36 of an available client system 32 requests a software GUI test instance from test server engine 24 in response to completing a preceding test instance. At step 108, in response to the request from client system 32, test server engine 24 determines whether test queue 28 contains one or more available test instances. If test queue 28 is empty, at step 110 test server engine 24 may notify client controller 36 that no test instances are available for execution. If a test instance is available in test queue 28, at step 112 test server engine 24 retrieves the next test instance from test queue 28 and, at step 114, test server engine 24 communicates the retrieved test instance to the requesting client system 32 for execution.

At step 116, client system 32 uses WINRUNNER software to execute the test instance, although, as stated above, any automated testing software may be used. At step 118, when client system 32 has completed executing the test instance, client controller 36 of client system 32 reports the test result for the test instance to test server engine 24. At step 120, substantially simultaneous with or substantially immediately after step 118, the method returns to step 106, and client controller 36 requests another test instance from test server engine 24. Test server engine 24 stores the received test result in test results database 30 at step 122. At step 124, test server engine 24 triggers a script to generate an updated test results web page 40 reflecting the new test result, which is made accessible in any suitable manner to one or more users at step 126. These operations preferably occur in parallel and substantially continuously across all client systems 32 throughout the testing cycle to provide one or more of the technical advantages described above.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for distributed automated software graphical user interface (GUI) testing, comprising:
   a centralized test queue operable to store a plurality of software GUI test instances to be executed by a plurality of distributed test execution computers, each distributed test execution computer comprising a client platform and coupled to one or more server platforms, the client platforms and server platforms collectively providing a plurality of client-server combinations against which the software GUI test instances may be executed; and
   a test server engine operable to, for each distributed test execution computer:
      receive a request for a software GUI test instance from a particular distributed test execution computer in response to completion of a preceding software GUI test instance by the particular distributed test execution computer;
      retrieve a software GUI test instance from the test queue in response to the request from the particular distributed test execution computer;
      communicate the retrieved software GUI test instance to the particular distributed test execution computer for execution against a particular client-server combination using a testing component supported by the particular distributed test execution computer, the testing component operable to perform automated software GUI testing and to produce test results for such testing for communication to the test server engine;
      receive a test result for the software GUI test instance from the particular distributed test execution computer in response to execution of the software GUI test instance; and
      store the received test result in a test results database, for reporting to one or more users.

2. The system of claim 1, wherein at least one distributed test execution computer operates at a location geographically remote from the other distributed test execution computers and from the test server.

3. The system of claim 1, wherein the testing component is a commercial off-the-shelf product.

4. The system of claim 1, wherein each software GUI test instance is an instance of a software GUI test written using a test scripting language and can be executed using any of the distributed test execution computers, a software GUI test instance being executed using the particular distributed test execution computer from which the request initiating retrieval of the software GUI test instance from the test queue was received.

5. The system of claim 1, wherein:
   the test server engine is further operable to generate a test results web page comprising test results for a plurality of software GUI test instances, including the test result for the most recently executed software GUI test instance, substantially immediately upon receiving the test result from the particular distributed test execution computer on which the most recently executed software GUI test instance was executed; and
   the system further comprises a web server operable to communicate the test results web page for display on a user system to provide substantially real-time test results reporting.

6. The system of claim 5, wherein:
each software GUI test instance is an instance of a software GUI test; and
the test results web page comprises consolidated test results for a particular client platform, the consolidated test results indicating test results for each software GUI test for each client-server combination involving the particular client platform.

7. The system of claim 5, wherein the test server engine is further operable to receive a user request to execute an instance of a particular software GUI test and to insert the requested software GUI test instance into the test queue according to the user request, the user request being input by selecting the particular software GUI test using the test results web page.

8. The system of claim 1, wherein at least some GUI test instances in the test queue have associated priorities, the test server engine operable to retrieve the GUI test instances from the test queue for execution according to their associated priorities.

9. The system of claim 1, wherein the test queue comprises a first queue containing higher priority software GUI test instances and a second queue containing lower priority software GUI test instances, the test server engine operable to retrieve higher priority software GUI test instances from the first queue for execution during a first part of a testing period and retrieve lower priority software GUI test instances from the second queue for execution during a second part of the testing period.

10. The system of claim 1, wherein the test server engine is operable to re-communicate instances of a software GUI test for execution against all client-server combinations, according to a rule, in response to receiving one or more test results for the software GUI test indicating failure.

11. The system of claim 1, wherein the test server engine is operable to detect when the number of software GUI test instances in the test queue is below a predefined threshold and, in response, to automatically add software GUI test instances to the test queue.

12. The system of claim 1, further comprising a client controller associated with each distributed test execution computer and operable to automatically install a current software GUI build at each distributed test execution computer at one or more appropriate times during a testing period.

13. The system of claim 1, further comprising a client controller associated with each distributed test execution computer and operable to automatically reboot each distributed test execution computer according to a predetermined schedule.

14. The system of claim 1, further comprising a client controller associated with each distributed test execution computer and operable to establish communication with the test server engine when the distributed test execution computer boots up.

15. The system of claim 1, wherein each test execution computer operates as an automated test execution robot, repeatedly requesting, receiving, executing, and returning test results for software GUI test instances, automatically and without human intervention, for an extended time period.

16. The system of claim 1, further comprising the distributed test execution computers.

17. A method for distributed automated software graphical user interface (GUI) testing, the method comprising:
maintaining a centralized test queue operable to store a plurality of software GUI test instances to be executed by a plurality of distributed test execution computers, each distributed test execution computer comprising a client platform and coupled to one or more server platforms, the client platforms and server platforms collectively providing a plurality of client-server combinations against which the software GUI test instances may be executed; and
receiving, for each distributed test execution computer, a request for a software GUI test instance from a particular distributed test execution computer in response to completion of a preceding software GUI test instance by the particular distributed test execution computer;
retrieving, for each distributed test execution computer, a software GUI test instance from the test queue in response to the request from the particular distributed test execution computer;
communicating, for each distributed test execution computer, the retrieved software GUI test instance to the particular distributed test execution computer for execution against a particular client-server combination using a testing component supported by the particular distributed test execution computer, the testing component operable to perform automated software GUI testing and to produce test results for such testing;
receiving, for each distributed test execution computer, a test result for the software GUI test instance from the particular distributed test execution computer in response to execution of the software GUI test instance; and
storing, for each distributed test execution computer, the received test result in a test result database, for reporting to one or more users.

18. The method of claim 17, wherein at least one distributed test execution computer operates at a location geographically remote from the other distributed test execution computers and from a computer system on which the method is performed.

19. The method of claim 17, wherein the testing component is a commercial off-the-shelf product.

20. The method of claim 17, wherein each software GUI test instance is an instance of a software GUI test written using a test scripting language and can be executed using any of the distributed test execution computers, a software GUI test instance being executed using the particular distributed test execution computer from which the request initiating retrieval of the software GUI test instance from the test queue was received.

21. The method of claim 17, further comprising:
generating a tests results web page comprising test results for a plurality of software GUI test instances, including the test result for the most recently executed software GUI test instance, substantially immediately upon receiving the test result from the particular distributed test execution computer on which the most recently executed software GUI test instance was executed; and
communicating the test results web page for display on a user system to provide substantially real-time test results reporting.

22. The method of claim 21, further comprising:
each software GUI test instance is an instance of a software GUI test; and
generating a test results web page comprising consolidated test results for a particular client platform, the consolidated test results indicating test results for each software GUI test for each client-server combination involving the particular client platform.

23. The method of claim 21, further comprising receiving a user request to execute an instance of a particular software GUI test and inserting the requested software GUI test instance into the test queue according to the user request, the user request being input by selecting the particular software GUI test using the test results web page.

24. The method of claim 17, wherein at least some software GUI test instances in the test queue have associated priorities, the method further comprising retrieving the software GUI test instances from the test queue for execution according to their associated priorities.

25. The method of claim 17, further comprising:
maintaining a first queue containing higher priority software GUI test instances and a second queue containing lower priority software GUI test instances;
retrieving higher priority software GUI test instances from the first queue for execution during a first part of a testing period; and
retrieving lower priority software GUI test instances from the second queue for execution during a second part of the testing period.

26. The method of claim 17, further comprising re-communicating instances of a software GUI test for execution against all client-server combinations, according to a rule, in response to receiving one or more test results for the software GUI test indicating failure.

27. The method of claim 17, further comprising detecting when the number of software GUI test instances in the test queue is below a predefined threshold and, in response, automatically adding software GUI test instances to the test queue.

28. The method of claim 17, further comprising automatically installing a current software GUI build at each distributed test execution computer at one or more appropriate times during a testing period.

29. The method of claim 17, further comprising automatically rebooting each distributed test execution computer according to a predetermined schedule.

30. The method of claim 17, further comprising automatically establishing communication between the distributed test execution computer and a test server engine when the distributed test execution computer boots up.

31. The method of claim 17, wherein each test execution computer operates as an automated test execution robot, repeatedly requesting, receiving, executing, and returning test results for software GUI test instances, automatically and without human intervention, for an extended time period.

32. Software for conducting distributed automated software graphical user interface (GUI) testing, the software being embodied in computer-readable media and when executed operable to:
maintain a centralized test queue operable to store a plurality of software GUI test instances to be executed by a plurality of distributed test execution computers, each distributed test execution computer comprising a client platform and coupled to one or more server platforms, the client platforms and server platforms collectively providing a plurality of client-server combinations against which the software GUI test instances may be executed; and
receive, for each distributed test execution computer, a request for a software GUI test instance from a particular distributed test execution computer in response to completion of a preceding software GUI test instance by the particular distributed test execution computer;
retrieve, for each distributed test execution computer, a software GUI test instance from the test queue in response to the request from the particular distributed test execution computer;
communicate, for each distributed test execution computer, the retrieved software GUI test instance to the particular distributed test execution computer for execution against a particular client-server combination using a testing component supported by the particular distributed test execution computer, the testing component operable to perform automated software GUI testing and to produce test results for such testing;
receive, for each distributed test execution computer, a test result for the software GUI test instance from the particular distributed test execution computer in response to execution of the software GUI test instance; and
store, for each distributed test execution computer, the received test result in a test result database, for reporting to one or more users.

33. The software of claim 32, wherein at least one distributed test execution computer operates at a location geographically remote from the other distributed test execution computers and from the software.

34. The software of claim 32, wherein the testing component is a commercial off-the-shelf product.

35. The software of claim 32, wherein each software GUI test instance is an instance of a software GUI test written using a test scripting language and can be executed using any of the distributed test execution computers, a software GUI test instance being executed using the particular distributed test execution computer from which the request initiating retrieval of the software GUI test instance from the test queue was received.

36. The software of claim 32, further operable to:
generate a test results web page comprising test results for a plurality of software GUI test instances, including the test result for the most recently executed software GUI test instance, substantially immediately upon receiving the test result from the particular distributed test execution computer on which the most recently executed software GUI test instance was executed; and
communicate the test results web page for display on a user system to provide substantially real-time test results reporting.

37. The software of claim 36, wherein:
each software GUI test instance is an instance of a software GUI test; and
further operable to generate a test results web page comprising consolidated test results for a particular client platform, the consolidated test results indicating test results for each software GUI test for each client-server combination involving the particular client platform.

38. The software of claim 36, further operable to receive a user request to execute an instance of a particular software GUI test and to insert the requested software GUI test instance into the test queue according to the user request, the user request being input by selecting the particular software GUI test using the test results web page.

39. The software of claim 32, wherein at least some software GUI test instances in the test queue have associated priorities and the software is further operable to retrieve the software GUI test instances from the test queue for execution according to their associated priorities.

40. The software of claim 32, wherein the test queue comprises a first queue containing higher priority software GUI test instances and a second queue containing lower priority software GUI test instances, the software is further operable to retrieve higher priority software GUI test instances from the first queue for execution during a first part of a testing period and retrieve lower priority software GUI test instances from the second queue for execution during a second part of the testing period.

41. The software of claim 32, further operable to re-communicate instances of a software GUI test for execution against all client-server combinations, according to a rule, in response to receiving one or more test results for the software GUI test indicating failure.

42. The software of claim 32, further operable to detect when the number of software GUI test instances in the test queue is below a predefined threshold and, in response, to automatically add software GUI test instances to the test queue.

43. The software of claim 32, further comprising software associated with each distributed test execution computer and operable to automatically install a current software GUI build at each distributed test execution computer at one or more appropriate times during a testing period.

44. The software of claim 32, further comprising software associated with each distributed test execution computer and operable to automatically reboot each distributed test execution computer according to a predetermined schedule.

45. The software of claim 32, further comprising software associated with each distributed test execution computer and operable to automatically establish communication, when the distributed test execution computer boots up, required for the distributed test execution computer to receive software GUI test instances for execution.

46. The software of claim 32, wherein each test execution computer operates as an automated test execution robot, repeatedly requesting, receiving, executing, and returning test results for software GUI test instances, automatically and without human intervention, for an extended time period.

47. A system for distributed automated software GUI testing, comprising:

means for maintaining a centralized test queue operable to store a plurality of software GUI test instances to be executed by a plurality of parallel distributed test execution computers, each distributed test execution computer comprising a client platform and coupled to one or more server platforms, the client platforms and server platforms collectively providing a plurality of client-server combinations against which the software GUI test instances may be executed; and means for receiving a request for a software GUI test instance from each particular distributed test execution computer in response to completion of a preceding software GUI test instance by the distributed test execution computer;

means for retrieving a software GUI test instance from the test queue in response to the request from the particular distributed test execution computer;

means for communicating the retrieved software GUI test instance to the particular distributed test execution computer for execution parallel against a particular client-server combination using a testing component supported by the particular distributed test execution computer, the testing component operable to perform automated software GUI testing and to produce test results for such testing;

means for receiving a test result for the software GUI test instance from the particular distributed test execution computer in response to execution of the software GUI test instance; and means for storing the received test result in a test result database, for reporting to one or more users.

* * * * *